(No Model.)

2 Sheets—Sheet 1.

C. V. WOERD.
LATHE CUTTER.

No. 268,339.

Patented Nov. 28, 1882.

Witnesses.

Inventor.

(No Model.) 2 Sheets—Sheet 2.
C. V. WOERD.
LATHE CUTTER.
No. 268,339. Patented Nov. 28, 1882.
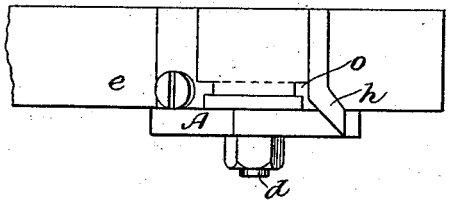
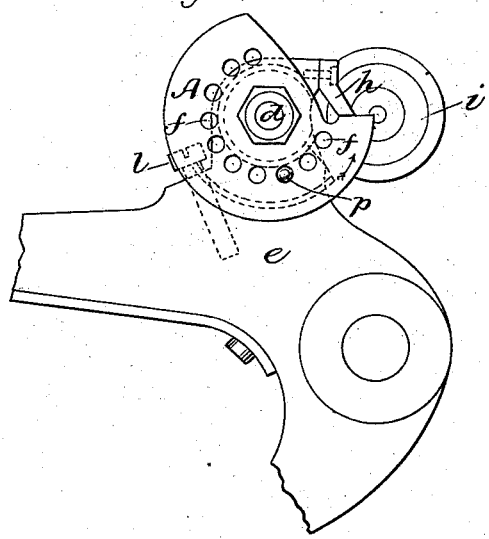
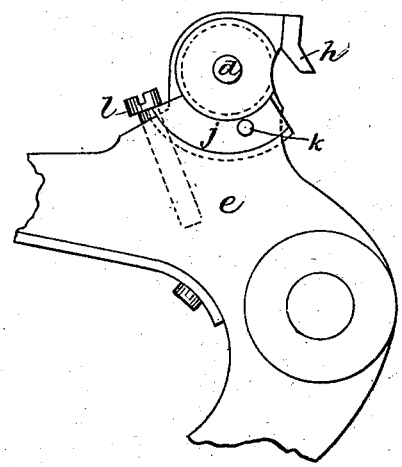
Witnesses.
C. P. Judd
A. L. White
Inventor
C. V. Woerd
by Wight & Brown
Attys

UNITED STATES PATENT OFFICE.

CHARLES V. WOERD, OF WALTHAM, MASSACHUSETTS.

LATHE-CUTTER.

SPECIFICATION forming part of Letters Patent No. 268,339, dated November 28, 1882.

Application filed January 13, 1882. (No model.)

*To all whom it may concern:*

Be it known that I, CHARLES V. WOERD, of Waltham, in the county of Middlesex and State of Massachusetts, have invented certain Improvements in Lathe-Cutters and Means for Grinding the Same, of which the following is a specification.

This invention relates to cutters for use in lathes or analogous machines for reducing or severing a rotating metallic object, and is particularly adapted for use in the machines for roughing out pinions, arbors, &c., for watches, described in my pending application for Letters Patent of the United States, filed August 20, 1881. The invention has for its object to provide certain improvements in the construction of the cutter, and in the means for holding the same in its operative position, all of which I will now proceed to describe and claim.

Figure 1:
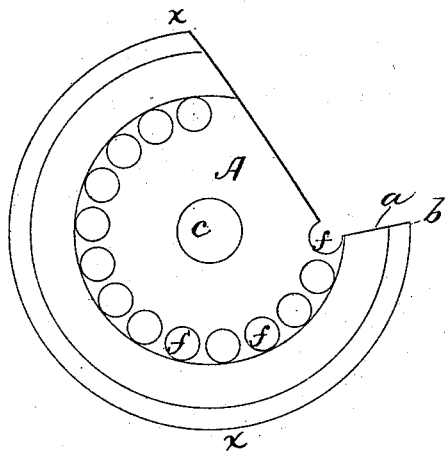
Figure 2:
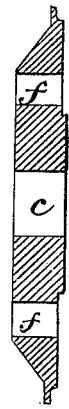

Of the accompanying drawings, forming a part of this specification, Figure 1 represents a side view of a cutter, somewhat enlarged, embodying my invention. Fig. 2 represents a section on line $x\,x$, Fig. 1. Figs. 3, 4, and 5 represent the devices employed for holding the cutter in operative position.

The same letters of reference indicate the same parts in all the figures.

In the drawings, A represents my improved cutter, which is composed of a circular plate or disk cut away or notched at one side, as shown in Fig. 1, one side, $a$, of the notch forming a sufficient angle with the perimeter of the plate to constitute a cutting-edge, $b$, said angle being preferably acute. The segmental edge or perimeter of the plate A may have any desired form in transverse section, according to the work it is intended to perform. At the center of the plate A is an orifice, $c$, which is concentric with the perimeter, and secures the supporting pin or stud $d$, which is attached to a suitable support, $e$, said support being, in the present instance, a pivoted lever adapted to be turned on its pivot to move the cutter toward and from the work. The cutter is secured to the support by a nut screwed upon the outer end of the pin $d$, and when said nut is loosened the cutter can be turned on the pin for purposes of adjustment.

$f\,f\,f$ represent a concentric series of holes in the plate A, said holes being equidistant from the center of the plate, and at such a distance from the margin thereof that the first hole in the series is merged or opens into the apex of the notch of the plate.

$h$ represents a fixed finger or stop attached to the support $e$, and adapted to bear upon the side $a$ of the notch in the plate A and limit the rotation of the plate on its pin $d$ in the direction indicated by the arrow in Fig. 3. The location of the stop $h$ is such that it will arrest the plate when its cutting edge or angle is in its proper position relatively to the work presented to it by the chuck $i$. (See Fig. 3.) $o$ represents a segmental slot or groove in the support $e$, concentric with the pin $d$, on which the plate A is placed. In said slot is adapted to slide a segmental piece, $j$, which has an orifice, $k$, adapted to coincide with one of the orifices $f$ of the plate A, and to receive a pin, $p$, passed through said orifice $f$. The slide or piece $j$ is prevented from moving in a direction opposite to that indicated by the arrow in Fig. 3 by an adjustable stop, which is the head of a screw, $l$, working in a tapped orifice in the support $e$. The head of the screw bears upon one end of the slide $j$. It will be seen that by the co-operation of the slide $j$ and its stop and pin with the stop $h$ the plate A is positively held and cannot be accidentally turned on its pin $d$ in either direction. The slide $j$ and its pin and stop are not essential, however, in all cases, but should be employed for heavy work. The screw $l$ may be adjusted sufficiently to permit the slide a sufficient movement to cause its pin-hole $k$ to coincide with a new hole, $f$, after the plate A has been sharpened and adjusted.

The holes $f$ in the plate A not only serve to receive the holding-pin $p$, as above described, but also each hole in succession forms a recess behind the inner end of the surface $a$ of the notch of the plate A as said plate is worn away by grinding.

I claim—

1. The improved cutter composed of a circular plate notched to leave a segmental margin and an operative cutting edge or angle, and provided with a concentric series of holes, as and for the purposes set forth.

2. The combination, with the notched circular plate having its cutting-edge formed as described, provided with a concentric series of holes, and adapted to be rotated by its support for adjustment of the adjustable segmental piece $j$, adapted to slide in a segmental slot in the supporting-frame, and provided with a pin adapted to enter one of the holes of the plate, as set forth.

3. The combination of the notched plate having a concentric series of holes, and adapted to be rotated on its support for adjustment, the stop $h$, adapted to prevent the rotation of the plate in one direction, and the slide $j$, pin $p$, and adjustable stop $l$, adapted to prevent the rotation of the plate in the opposite direction, as set forth.

In testimony whereof I have signed my name to this specification, in the presence of two subscribing witnesses, this 31st day of December, A. D. 1881.

CHAS. V. WOERD.

Witnesses:
M. S. G. WILDE,
CHAS. A. BERRY.